Patented Jan. 9, 1934

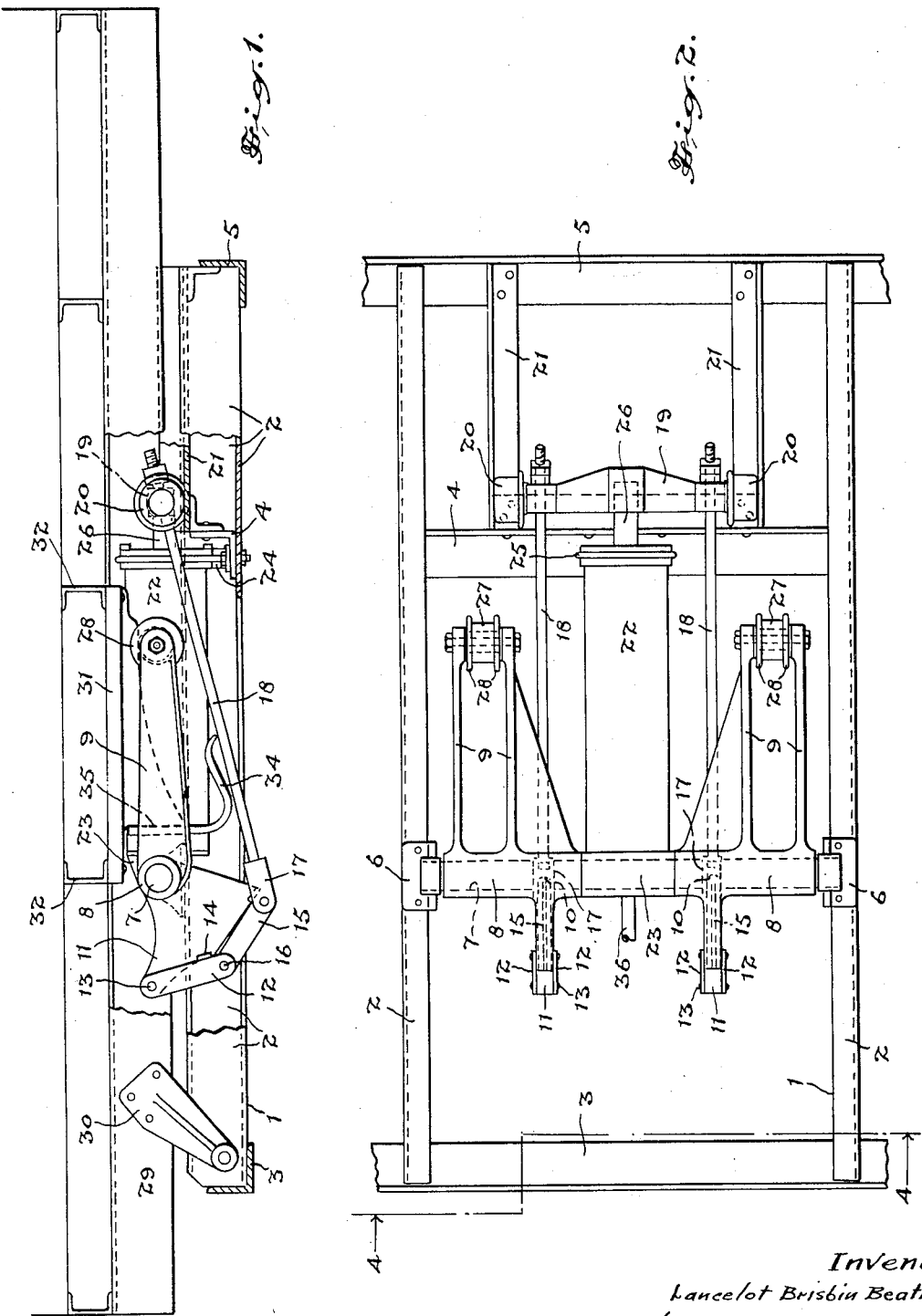

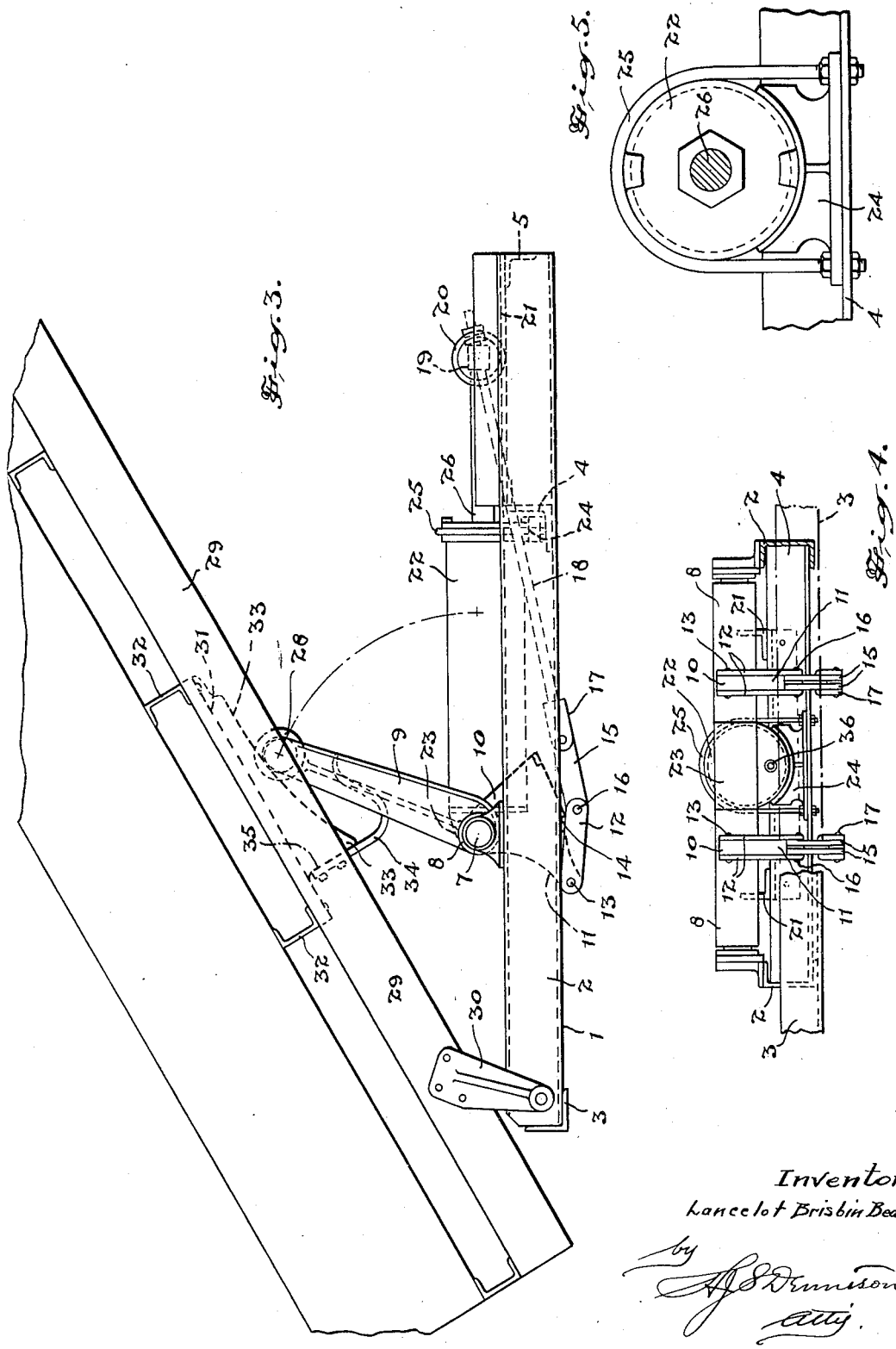

1,943,050

UNITED STATES PATENT OFFICE 1,943,050

HOISTING MECHANISM FOR DUMP TRUCKS

Lancelot Brisbin Beath, Toronto, Ontario, Canada

Application August 28, 1931. Serial No. 560,026

4 Claims. (Cl. 298—22)

The principal objects of this invention are, to provide a simple and efficient mechanism for hoisting the pivotal body of the dump trucks, and to devise a construction which will be strong and durable and will be inexpensive to manufacture and install.

The principal features of the invention consist in the novel construction and arrangement of a pair of lever members pivotally mounted on the truck chassis and engaging a surface on the hinged dump body, together with flexible connections to a reciprocating power unit, whereby the thrust of the unit rotates the levers to raise the dump body and swing it upon its pivot.

In the accompanying drawings, Figure 1 is a side elevational view of the upper frame of the truck chassis and the lower frame of the dump body, being shown partly broken away and showing in elevation the hoisting mechanism.

Figure 2 is a plan view of the hoisting mechanism mounted on the chassis.

Figure 3 is an elevational view showing the mechanism with the dump body in partly raised position.

Figure 4 is a rear end elevational view of the hoisting mechanism taken from the line 4—4 of Figure 2.

Figure 5 is an enlarged elevational detail of one end of the hydraulic cylinder showing the means of support therefor.

In the operation of dump trucks where very heavy loads are handled it is important that the truck be equipped with a hoisting mechanism of a rugged and powerful nature and one which will raise a capacity load without undue stress.

In the device herein shown the frame 1 which forms part of the truck chassis is constructed of a pair of channel bars 2 joined by transverse angle bars 3, 4 and 5.

Mounted on the upper flanges of the side channels 2 are a pair of brackets 6 in which is rigidly secured a cross shaft 7.

Rotatably mounted on the shaft 7 are a pair of sleeve members 8 which form an integral part of the flanged lever arms 9.

Secured to or formed integral with each of the sleeves 8 and arms 9 is a sector shaped flange 10 which is formed with an extension lug 11 to which a pair of links 12 are pivotally secured by the pin 13.

Lugs 14 are provided on each side of the flange 10 to engage the upper edges of the links 12.

A pair of links 15 are pivotally connected by the pin 16 between the free ends of the links 12 and are adapted to bear against the outer edge of the flange 10.

A jaw 17 is pivotally connected to each of the links 15 and to each jaw is secured a rod 18 which extends forwardly and angularly upward and is connected to a cross head 19 mounted upon flanged rollers 20 which travel on short angle bar guides 21 arranged in the frame 1.

It will be noted that the quadrant flange is so shaped that the pivotal connection of the links 12 to the quadrant through the pin 13 is an equal distance from the axis of the shaft 7 to the position of the pin 16 connecting the links 12 and 15 and that of the pin connecting the links 15 with the jaw 17 so that the pull of the rods 18 on the quadrant is uniform.

The rods 18 are connected to the cross head with a swivel connection extending through a slot in the cross head so as to permit a limited amount of swinging movement as the cross head moves back and forth.

A hydraulic cylinder 22 is provided with a sleeve extension 23 from its rear cap which is mounted on the shaft 7 between the lever sleeves 8.

The forward end of the cylinder 22 is rigidly clamped to a saddle block 24 mounted upon the cross bar 4, the clamping member being here shown in the form of a U bolt 25.

The cross head 19 is rigidly secured to the outer end of the piston rod 26 operating in the cylinder 22.

The lever members 9 are here shown formed double and between the outer ends of each pair of said arms is mounted a roller 27 formed with flanges 28 at either side.

The frame 29 of the dump body is provided with pivot brackets 30 upon which the frame swings in an upward direction from its normal horizontal position over the frame 1.

Blocks 31, preferably formed of cast metal, are rigidly secured between the cross members 32 of the frame 29 and these blocks are provided with a downwardly extending cam-shaped web portion 33 which curves downwardly from the forward end and rests between the flanges 28 of the roller 27 and extends between the parallel members of the lever.

A hook-shaped member 34 is rigidly secured to the squared end 35 of the lug 33 and extends below the curved bottom surface of the web and projects forwardly thereunder and is spaced therefrom.

The hook member extends between the paired lever members and is adapted to receive the roller and by engagement with said roller to limit the backward movement of the dump body when it is raised to its maximum height.

In the operation of this device hydraulic pressure is applied to the interior of the cylinder 22 through a suitable pipe connected at the point 36 in the head of the cylinder. The pressure against the piston forces the piston rod 26 outwardly moving the cross head 19 forward on the guide bars 21 and pulling on the rods 18. These rods connect with the links 15 and 12 and pull against the sector-shaped flange 10 to swing it on its pivot on the shaft 7 and as the sector swings forwardly the front end thereof swings clear of the links 15, while the pull is continued through the links 12.

It will be seen that the first pull, initiated when the device is in the position illustrated in Figure 1, is exerted against the segmental flange directly, but as the flange swings on its pivot the pull is transmitted through the links 15 to a point farther back which is where the links 12 bear against the side lugs 14 and this pull continues until the lugs 14 are free of the links 12 and the pull is then directed upon the pin 13 to the bottom flange.

The lever arms 9 are preferably cast as an integral part with the sleeve 8 and segmental flanges 10 so that by pulling upon the flange 10 and turning the sleeves upon their bearing on the shaft 7, the levers 9 swing upwardly. The rollers on the free ends of the levers 9 engage the cam-shaped surface of the web 33 of the blocks 31 and lift upwardly, swinging the body frame 29 on its pivots.

The cam-shaped surface of the blocks 31 may be so designed as to give the very best efficiency in the lifting operation of these levers, but by curving them downwardly at the rear end greater speed of operation in the final movement of raising the dump bodies is obtained.

The retaining action of the hook members 34 extending around the rollers 27 will be readily appreciated as forming an effective safe-guard against the body overturning in the event of the truck being in an inclined position when dumping.

The arrangement of hydraulic control in the operation of the piston in the cylinder is not shown as numerous forms of pumps and control valves may be utilized with equal facility on the present structure which is, as will be readily seen extremely simple, compact and durable.

The construction herein shows the use of a hydraulic cylinder as the power unit but any suitable power unit may be used to operate the means for swinging the hoisting levers on their pivots.

What I claim as my invention is:—

1. In a dump truck, the combination with the chassis and dump body pivotally mounted thereon, of a shaft transversely mounted on the chassis, longitudinally disposed cam blocks extending downwardly from the dump body, a pair of sleeves rotatably mounted on the shaft, a pair of levers extending from each of said sleeves and disposed to either side of the respective cam blocks to receive the latter therebetween when the body moves downwardly, rollers supported between the free ends of each pair of levers and co-operating with the cam blocks, and means for rotating said sleeve members.

2. In a dump truck, the combination with the chassis and dump body pivotally mounted thereon, of a shaft rigidly secured to and extending across said chassis, sleeves on said shaft, each having a pair of lever arms spaced apart, rollers mounted between each pair of lever arms at the free end thereof, cam blocks mounted on the dump body and engaged by said rollers to raise the dump body, said cam block presenting cam surfaces for varying the effective raising thrust of said rollers thereagainst in proportion to the degree of displacement of said lever arms, quadrant flanges on said sleeves, and means mounted in the chassis and operatively connected with said quadrant flanges to swing said levers in unison.

3. In a dump truck, the combination with the chassis and dump body pivotally mounted thereon, of a shaft transversely mounted on the chassis, a block rigidly secured to the dump body and having a longitudinally extending lower edge cam portion curving downwardly, a hook member secured to the end of said cam portion and extending therebelow and forming a guard, a lever on said shaft having a longitudinal slot adapted to accommodate said cam and hook when the dump body is lowered, a flanged roller mounted on the end of said lever engaging the under cam edge of the block, said hook being adapted to engage and retain said roller on the downward curving portion of the cam block at the end of the raising movement, and means mounted on the chassis for swinging said lever upwardly.

4. In a dump truck, a chassis, a body pivotally mounted at one end of said chassis, a shaft rigidly mounted at the ends on the sides of said chassis, a pair of sleeves rotatably mounted on said shaft one at each end and each having a forward lever extension and a rearward cam extension, a hydraulic cylinder supported on said shaft between said levers and extending forwardly, a crosshead arranged at the forward end of said cylinder and connected to the cylinder piston, a rod secured to each end of said cross head and extending rearwardly, flexible links connecting said rods each to one of said cams, and cams on the underside of said body engaged by said levers to raise and lower the body on its pivot.

LANCELOT BRISBIN BEATH.